No. 834,834. PATENTED OCT. 30, 1906.
C. H. MATTHEWS.
CORN CULTIVATOR AND WEEDER.
APPLICATION FILED MAR. 9, 1906.
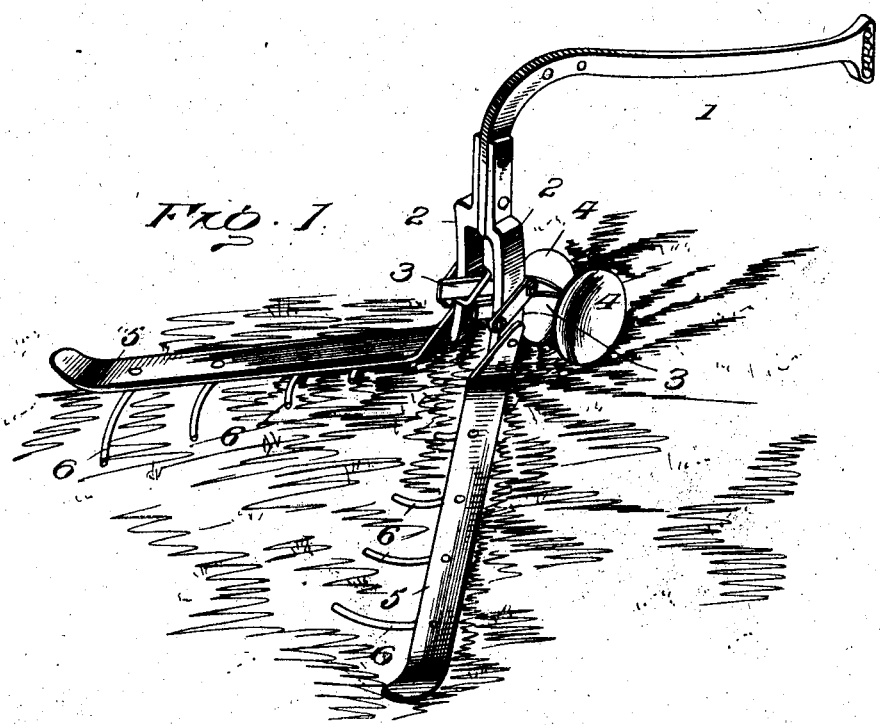
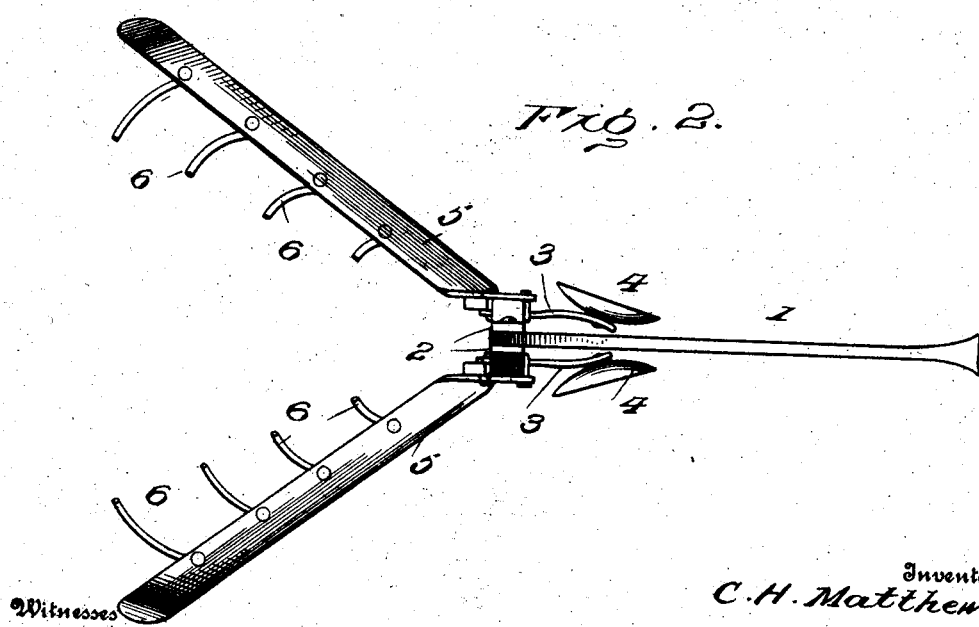

UNITED STATES PATENT OFFICE.

CHARLES H. MATTHEWS, OF SELDEN, KANSAS.

CORN CULTIVATOR AND WEEDER.

No. 834,834.　　　　　Specification of Letters Patent.　　　　　Patented Oct. 30, 1906.

Application filed March 9, 1906. Serial No. 305,102.

*To all whom it may concern:*

Be it known that I, CHARLES H. MATTHEWS, a citizen of the United States, residing at Selden, in the county of Sheridan and State of Kansas, have invented certain new and useful Improvements in Corn Cultivators and Weeders, of which the following is a specification.

This invention embodies improvements in agricultural implements; and it consists of a novel form of cultivator and weeder for corn or the like.

The object of the invention is to secure an implement of the above type which in practical use will effectively loosen the ground near the small corn, will remove from the furrow all trash or foreign matter—such as old cornstalks, stubs, and weeds—and also cut the ground or earth as deep as the corn is listed. Means are also provided to throw weeds below the surface of the ground upwardly to the surface as the implement is advanced.

For a full description of the invention and the merits thereof and also to acquire a knowledge of the details of construction of the means for effecting the result reference is to be had to the following description and accompanying drawings, in which—

Figure 1 is a perspective view of a cultivator and weeder embodying the invention. Fig. 2 is a top plan view.

Corresponding and like parts are referred to in the following description and indicated in both the views of the drawings by the same reference characters.

Referring to the drawings, the numeral 1 designates the beam, the rear end portion of which curves downwardly and has secured to opposite sides thereof bars 2, arranged in spaced relation so as to virtually form an arched stock for the implement. Each of the bars 2 has an adjustably-mounted arm 3 attached thereto, said arm projecting forwardly and downwardly from the bars 2, so as to readily support disks 4, secured to the front end portions thereof. The arms 3 may be attached to the bars 2 by clamps or any suitable means admitting of adjustment of the arms to correspondingly adjust the position of the disks 4. Secured to the lower end portions of the bars 2 or spaced parts of the arched stock are knives 5, horizontally arranged and extending rearwardly from the stock in divergent relation. The front extremities of the knives 5 extend upwardly, so as to be readily secured to the bars 2, the front edge portions of said knives being sharpened to subserve the cutting action thereof. A plurality of upwardly-curving fingers 6 are carried by each knife 5 and are designed to throw the weeds below the surface of the earth upwardly to the surface as the knives 5 cut through the furrow, said fingers coacting with the knives to thoroughly pulverize the ground in a manner which will be readily apparent.

The implement above described is not only designed for use for listed corn, but may also be used on the level ground. The mounting of the disks 4 is such that they may be adjusted so as to cut through any desired depth. The implement may be readily attached to the riding-lister by securing the weeder-beam to the lister after removal of the beam of the latter. The knives 5 are so disposed that there is no friction save on the cutting edges thereof, and this is of no small advantage in the practical operation of the invention, reducing the draft to a minimum. The arrangement of the disks also reduces the draft or resistance to the progress of the implement by reason of the fact that they are directly located in front of the bars 2, and so loosen the hard ground in front of the arched stock, so as to prevent clogging of the latter and retardation of the progress of the device.

Having thus described the invention, what is claimed as new is—

1. In an implement of the class described, the combination of a beam, spaced bars attached to the rear end of the beam and extending downwardly therefrom, disks arranged in advance of said bars, and cutting-knives supported by the bars.

2. In an implement of the class described, the combination of a beam, spaced supports attached to the rear end of the beam and extending downwardly therefrom, supporting-arms projecting forwardly from the bars, disks mounted on said supporting-arms, and cutting-knives horizontally arranged and supported by the respective bars in divergent positions.

3. In an implement of the class described, the combination of a beam embodying an arched stock at its end, disks mounted upon the stock and operating in advance of the same, and cutting-knives supported by the stock and projecting rearwardly therefrom in horizontal positions.

4. In an implement of the class described, the combination of a beam embodying an arched stock at its end, disks mounted upon the said stock and operating in advance of the same, cutting-knives supported by the stock and projecting rearwardly therefrom in horizontal positions, and means for adjusting the disks.

5. In an implement of the class described, the combination of a beam embodying an arched stock at its end, disks mounted upon said stock and operating in advance of the same, cutting-knives supported by the stock and projecting rearwardly therefrom in horizontal positions, and weeding devices applied to the knives.

6. In an implement of the class described, the combination of a beam embodying an arched stock at its end, disks adjustably mounted on the arched portions of the stock, cutting-knives supported by the stock and projecting rearwardly therefrom in horizontal positions, and weeding-fingers projecting upwardly from the knives.

7. In an implement of the class described, the combination of a beam embodying an arched stock at its end, disks mounted upon said stock and operating in advance of the same, cutting-knives supported by the stock and projecting rearwardly therefrom in horizontal positions, weeding-fingers curving upwardly and rearwardly from the knives, said knives being located in divergent positions, and means for adjusting the positions of the disks.

In testimony whereof I affix my signature in presence of two witnesses.

CHARLES H. MATTHEWS. [L. S.]

Witnesses:
JAMES C. TRIMBLE,
REX. L. NASON.